Oct. 23, 1973    J. E. LUNDSTROM    3,767,737
METHOD FOR PRODUCTION CASTING OF ULTRATHIN
POLYMER MEMBRANES
Filed Sept. 7, 1971

INVENTOR.
Jerry E. Lundstrom
BY
Morgan, Finnegan, Durham & Pine
ATTORNEYS

United States Patent Office 3,767,737
Patented Oct. 23, 1973

3,767,737
METHOD FOR PRODUCTION CASTING OF ULTRA-
THIN POLYMER MEMBRANES
Jerry E. Lundstrom, Schenectady, N.Y., assignor to
General Electric Company
Filed Sept. 7, 1971, Ser. No. 177,988
Int. Cl. B29d 7/06, 27/04
U.S. Cl. 264—41                                15 Claims

ABSTRACT OF THE DISCLOSURE

Ultrathin polymer membranes, which are non-porous but permeable, are provided by continuously transferring a polymer-containing casting solution upwardly through a floating support liquid and removing the solvent from the solution to form the membranes on the surface of the support liquid.

---

This invention relates to the production of ultrathin polymer membranes. More particularly, it concerns the production of non-porous polymer membranes which are more permeable to gases than any such material known heretofore. Such membranes are thin enough to produce multicolored interference patterns with white light as commonly observed in soap bubbles.

BACKGROUND OF THE INVENTION

Permeable, non-porous polymer membranes are commercially available as hollow capillaries and sheets of the order of 0.001 inch (1 mil) thickness. While thin, these membranes are too thick to produce interference patterns with white light and are thereby distinguished from the ultrathin membranes described herein.

A major potential use of polymer membranes is to separate gas mixtures. For example, if a pressure gradient of air is established across a properly supported silicone rubber membrane, oxygen will preferentially move across the barrier, and the gas collected on the other side will comprise oxygen-enriched air. One application of the use of such membranes is in the production of oxygen-enriched air for inhalation therapy of chronic pulmonary diseases.

The thickness of the membrane is an important factor in the design of the membrane package because the rate of gas transfer is characteristically inversely proportional to thicknes. For thin and ultrathin membranes, the size of a membrane package is proportional to the membrane area. Since the gas transfer is proportional to the membrane area, the gas transfer remains unchanged for a reduction in both the thickness and area by a common factor. This reduction, however, results in an equivalent reduction of the package size. Hence, for many applications, the minimum size of the package (and area of membrane) will be limited by membrane thickness, all other factors being held constant.

Commercially available membranes have a relatively fixed minimum thickness because of the limitations imposed by techniques available to prepare them. In conventional casting techniques, a solution of the polymer is cast directly onto an inert, nonporous support. Any dust or contaminant particles on the surface of the support or in the solution will be embedded in the membrane and will leave a pin-hole in the membrane when the membrane is stripped from the support. Also, some polymers strongly adhere to the support and considerable force is required to remove the membrane from the support. This produces stresses within the membrane that can impair its integrity and rupture a membrane of low tear strength.

Moveover, the apparatus used in the conventional method causes difficulty as the membrane thickness is reduced because the casting blade is difficult to set in the .5–1 mil region and this restricts the ultimate uniform membrane thickness to a minimum of no less than about 0.02 to 0.04 mil, and practically to about 0.080 to 0.120 mil as a minimum thickness.

The present invention provides an entirely new technique to prepare polymer membranes which overcomes the disadvantages outlined above.

DESCRIPTION OF THE INVENTION

According to the present invention, the polymer membrane is formed on the surface of a support liquid which floats on the surface of the casting solution. By means to be described, an ultrathin film of casting solution is continuously transferred to the surface of the support liquid to remove the membrane. The film migration and solvent evaporation processes occur sufficiently rapidly to make production casting of the ultrathin polymer membranes readily possible. Any dense particles in the casting solution will fall to the bottom of the body of casting solution and will not end up in the membrane to cause pin-holes.

Because the support for membrane formation is a stationary liquid, the first film of casting solution delivered to the surface sweeps the surface free of dust particles and provides a clean support for the preparation of subsequent membrane. Since the liquid support is immiscible with the casting solution and the polymer, the membrane can be removed cleanly from the support without inducing stresses in the membrane.

In principle, the thinnest uniform membrane that can be prepared by the method is a monomolecular film. In practice, membranes with visible interference patterns over their entire surface are provided.

Figure 1:
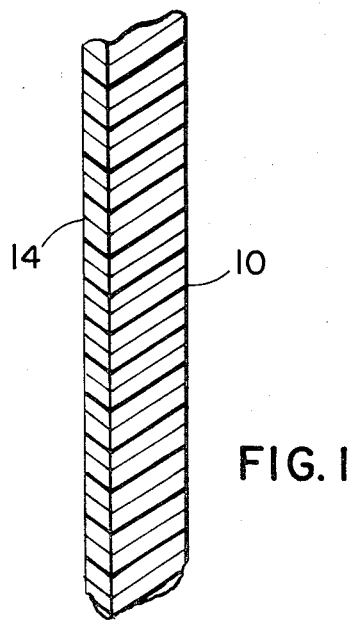
FIG. 1 is a cross-sectional, magnified view (not to scale) of an ultrathin membrane 14 produced according to this invention, on an inert support 10.
Figure 2:
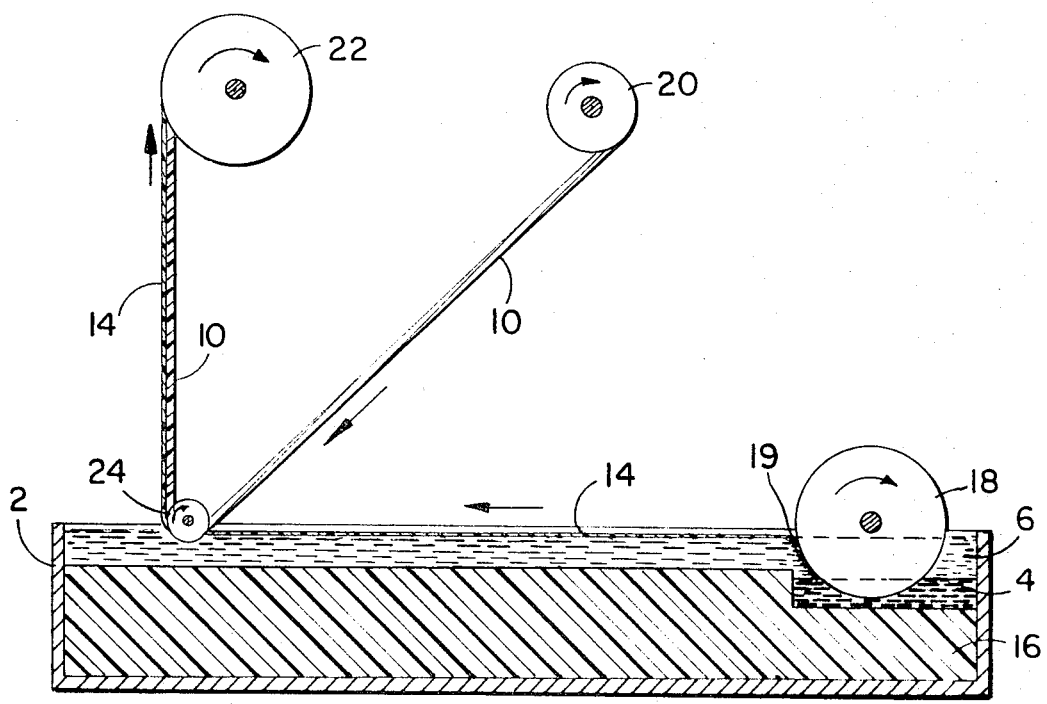
FIG. 2 illustrates an apparatus in which the present invention can be practiced.

The apparatus utilized according to the present invention is shown in FIG. 2. In this apparatus, a thin film of casting solution is transferred from the body of solution, through the body of support liquid to the upper surface of the support liquid by a moving surface means. In the apparatus shown, the moving surface means is the surface of a rotating roller. The apparatus of FIG. 2 provides for precise control over film transfer through the inert support liquid and delivery to the surface thereof.

The rate of delivery is controlled by the rate of movement of the carrying surface, e.g., the rate of rotation of the roller. Thus, any polymer/copolymer material that readily dissolves in the casting solvent can be delivered to the surface of the support liquid at a rate sufficient for the formation of a continuous membrane. Further control over the rate of delivery of the polymer to the surface is achieved through the concentration of polymer in the casting solution. The width and origin of the casting solution film delivered to the surface of the support layer is controlled by the dimensions of the moving surface, i.e., the roller.

Because only a small portion of the casting solution is exposed to air, i.e., the portion that wets the moving surface, the polymer concentration in the casting solution does not increase with time due to the evaporation of solvent. This facilitates casting of membranes continuously and reproducibly.

In more detail, with reference to FIG. 2, casting trough 2 is divided into a reservoir for a body of casting solution 4 which is a solution of polymer/copolymer material in a volatile solvent(s) located below a reservoir for a body of support liquid 6, which is less dense than and immiscible with the casting solution 4. Optional, inert spacer 16 on the bottom of the casting trough can be included to minimize the amount of casting solution used to fill the trough—otherwise the bottom of the trough can be machined or molded to provide the same effect. Solution roller 18 is used to uniformly deliver the casting solution to the surface of the support liquid at line contact 1. The moving surface should be smooth and chemically resistant to the support liquid and the casting solution. Casting solution 4 wets the underside of roller 18 and as the roller is slowly rotated the film of solution 4 on the roller is continuously transferred through the body of support liquid 6 and is deposited on the surface thereof at 19. The solvent in the deposited solution immediately begins to evaporate as the solution moves along the surface toward osculation roller 24.

After the solution has moved only a short distance, most of the casting solution solvent has evaporated and a continuous ultrathin membrane of the polymer material 14 appears on the surface. Osculation roller 24 is located in contact with the surface of support liquid 6 to guide movable inert support 10 to the surface of the support liquid where it picks up ultrathin polymer member 14. Inert support 10 is any material flexible enough to pass under osculation roller 24 and capable of being driven and stored on rollers 20 and 22. In addition, the inert support normally should not sorb or dissolve in the support liquid. In certain instances the latter requirements can be relaxed because osculation roller 24 can be located so that except for the lead-in and exit sections of the inert support, the support is in contact with the ultrathin polymer membrane alone. Suitable inert supports are made from polyethylene sheet, porous polypropylene, 1 mil diameter polyester fiber screen with 50% open area, polyethylene coated paper with holes, e.g., ¼" diameter holes spaced ¼" apart, and the like. Membrane 14—coated inert support 10 is drawn up on take up roller 22 and any adhering support liquid can be removed by heating or with a jet of air before winding on roller 22. Roller 22 pulls inert support 10 under osculation roller 24 and collects the membrane coated inert support. If desired, a second inert support can be introduced, by means not shown, to capture the ultrathin membrane in a protective sandwich between the two supports as it is rolled up. Feed roller 20 stores the inert support before it picks up the membrane. As will be obvious, in certain cases it may be desirable to drive all three rollers, 20, 24 and 22, to prevent compression or undue stretching of membrane 14 as it is rolled up on take-up roller 22.

The thickness of the membrane prepared in the apparatus described in FIG. 2 is controlled by: (i) the rate at which the casting solution is delivered by the moving surface to the surface of the support liquid—providing always that sufficient time is made available for the solvent to substantially completely evaporate before the membrane reaches osculation roller 24; (ii) the concentration of the polymer in casting solution 4—lower concentrations provide thinner films; and (iii) the rate at which membrane 14 is drawn up from the surface of support liquid 6 by take-up roller 22—the faster the rotation of roller 22—the thinner the polymer membrane.

The polymers useful for the present invention include, in general, any polymer or copolymer, including polymer blends, grafts, blocks, and interpolymers capable of film-casting from solvents. The polymers may be natural or synthetic substances, in the latter case, both addition and condensation polymers being included. They will be either organic or inorganic polymers and can be mixed organic and inorganic. Typical of the useful polymers will be those having repeating units selected from arylene ether, organosiloxane, aromatic carbonate, alkyl acrylate or alkyl methacrylate units or mixtures of any of the foregoing and blends, grafts, blocks, interpolymers comprised of such units. Special mention is made of polymers which include repeating units comprising 2,6-diphenyl-1,4-phenylene ether units and dimethylsiloxane units; those with units derived from methyl methacrylate; those including repeating units comprising bisphenol-A carbonate units and dimethylsiloxane units and the latter in which the repeating units are in alternating blocks; those which are a blend of repeating units comprising 2,6-dimethyl-1,4-phenylene ether and alternating blocks of repeating units comprising bisphenol-A carbonate units and dimethylsiloxane units; and the like. All such polymers are commercially available or can be prepared by methods known to those skilled in the art.

A particularly useful polymer includes alternating blocks of repeating units comprising bisphenol-A carbonate units and dimethylsiloxane units.

Such a polymer, in the processes described above, readily provides ultrathin polymer membranes, the membranes being thin enough to produce multicolored interference patterns with white light, yet non-porous, while being permeable to gases. It is readily possible by making the adjustments in the process operating details discussed above to provide such ultrathin films with membrane thicknesses of between about 0.005 and 0.05 mil.

The polymer comprising alternating blocks of repeating bisphenol-A carbonate units and repeating dimethylsiloxane units can be prepared following the teachings of R. P. Kambour, "Block Polymers," Plenum Press, 1970, p. 263–276, and citations given therein. In one procedure, a preformed alpha, omega-dichloropoly(dimethylsiloxane) is allowed to react with excess bisphenol-A in pyridine-methylene chloride solution to form a polyorganosiloxane chain terminated with bisphenol-A units. This intermediate then is treated with phosgene and additional bisphenol-A to form polycarbonate blocks in situ. After removal of pyridine and pyridine hydrochloride, the copolymer is isolated by solvent evaporation or precipitation in methanol. The materials are alternating, random block polymers of the —ABABA— type in which the blocks are polydisperse;

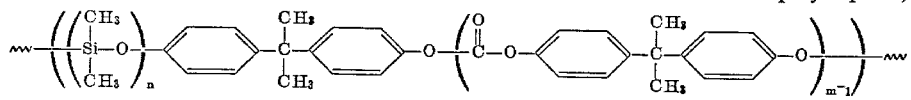

Polymer weight average molecular weight lies in the range 50,000 to 100,000, $\overline{n}$ and $\overline{m}$ being selected to accommodate these values.

The solvent for the casting solution will be selected from normally liquid hydrocarbon organic compounds having, e.g., from one to ten carbon atoms, and such compounds containing, e.g., halogen, nitrogen, oxygen or sulfur atoms and mixtures of the foregoing atoms and compounds. The particular casting solvent in any selected system will be selected to be immiscible with the support liquid used. Because the support liquid will float on the solvent, the casting solvent in each particular case will be more dense than the particular support liquid used. Those skilled in the art will have no difficulty in selected appropriate solvents, having knowledge of the solubility characteristics of the film forming polymer the mutual solubility characteristics of the support liquid and the reported densities for a multitude of solvents.

The solvents will be able to dissolve the polymers in moderately high concentration, e.g., about 5–15% by weight.

In general, because of their high densities, chlorinated hydrocarbons, e.g., methylene chloride, chloroform, carbon tetrachloride, 1,1,1-trichloroethane and the like, are preferred as casting solvents. Especially preferred is methylene chloride.

The most useful support liquid is water.

The combination of methylene chloride as casting solvent and water as support liquid appears to be most universally applicable, e.g., to silicone based copolymers, polymer blends containing one silicone polymer and non-silicone based polymers.

DESCRIPTION OF THE PREFERRED EMBODIMENT

The following example illustrates a procedure by which the present invention may be practiced. It is illustrative and is not to be construed to limit the invention in any way.

EXAMPLE 1

An apparatus illustrated diagrammatically in FIG. 2 is provided. The roller is a copper drum 10 inches wide.

A polymer solution comprising 5 wt. percent of an alternating block polymer of dimethylsiloxane and bisphenol-A carbonate (R.P. Kambour, "Block Polymers," Plenum Press, p. 263 (1970)) in methylene chloride is placed in the reservoir and water is floated in the upper reservoir. The roller 18 is slowly rotated in the direction shown and a thin film of the casting solution is fed upwardly through the water layer and a polymer membrane spreads thereon. A belt of porous polypropylene 10 is passed under the osculation roller 24 and wound on the take-up roller 22. The ultrathin membrane formed on the support liquid as the casting solvent evaporates is drawn from the surface of the support liquid by the porous polypropylene belt.

The procedure of this example is repeated substituting chloroform for methylene chloride as the casting solvent. Substantially similar results are obtained.

EXAMPLE 2

The procedure of Example 1 is repeated, substituting for the alternating block polymer of dimethylsiloxane and bisphenol-A carbonate, copolymers of poly(2,6-diphenyl-1,4-phenylene)ether and dimethylsiloxane; a blend of poly(2,6-dimethyl-1,4-phenylene)ether and the alternating block polymer of dimethylsiloxane and bisphenol-A carbonate, and poly(methyl methacrylate). In all cases, ultrathin polymer membranes according to this invention are obtained.

EXAMPLE 3

The procedure of Example 1 is repeated, substituting for the porous polypropylene the following materials: polyethylene sheet, polyethylene coated paper inert support, and 1 mil thickness polyester fiber screen with 50% open area. Substantially similar results are obtained.

Thickness is measured, pin-hole-free status is confirmed and permeability is determined for the ultrathin membrane prepared according to the method of Example 1 as follows:

A small area of the ultrathin, multicolored membrane resting on a porous wrapping paper is mounted in a conventional permeation apparatus. The area of the membrane exposed to the gas in the apparatus is about .24 $cm.^2$. The following permeabilities are obtained using pure nitrogen and oxygen at the indicated pressure and 25° C. The permeabilities in units of cc.(RTP)/$cm.^2$-sec.-cm. Hg are shown in Table I:

TABLE I.—PERMEABILITIES OF $O_2$ AND $N_2$ THROUGH ULTRATHIN POLYMER FILMS

| Gas | Press. diff., mm. Hg | Permeability ×10⁴ | Calcd. thickness Microns | Mils |
|---|---|---|---|---|
| $N_2$ | 610 | 1.75 | .46 | .018 |
|  | 675 | 1.81 | .44 | .017 |
|  | 335 | 1.60 | .50 | .020 |
| $O_2$ | 672 | 4.20 | .38 | .015 |
|  | 341 | 4.14 | .39 | .015 |

Estimated thicknesses in microns (and mils) of the membrane are calculated from the permeabilities given above and the literature values of the permeability coefficients for $O_2$ and $N_2$ through thicker membranes of the same polymer, i.e., 16 and 8 (in units of $10^{-9}$ cc.(RTP)-cm./$cm.^2$-sec.-cm. Hg), respectively.

The pinhole-free status of the ultrathin membrane is confirmed by the permeability ratio of $O_2$ to $N_2$ of 2.4. This is approximately the same ratio as that determined for thicker films of the same polymer, i.e., approximately two. If the membrane contains pinholes, the $O_2$ to $N_2$ ratio will be significantly less than two.

The ultrathin membranes are compared against the performance of conventional silicone rubber membrane packages and modules (fins). The test measure flow rate and percent oxygen of the gas leaving the low pressure side of the membrane (extract). Two small (by comparison with the four square foot fins) modules using the ultrathin membrane of Example 1 are constructed in a manner similar to the preparation of the silicone rubber fins except that either a very fine screen (2.7 mils thick with 50% open area—polyester screen) or a 30-mil thick sheet of porous polyethylene (Porex Materials Corp.) is inserted between the porous polypropylene sheet and the 9.5 mil fine polyester screen to minimize the irregularities in the surface supporting the ultrathin membrane. The complete stack consists of an aluminum plate, a 9.5 mil thick fine screen, either a very fine screen or the porous polyethylene sheet, a nominal one mil thick sheet of porous polypropylene (Celanese Corp.) and the ultrathin membrane of Example 1. A 1/16" outer diameter, thin-wall stainless steel tube inserted into a hole in the end of the aluminum sheet and sealed in place with epoxy serves as the extract port. The edges of the stack are sealed to the aluminum sheet using a room temperature vulcanizing silicone cement. The room temperature results for the two ultrathin membrane modules are presented in Table II. Typical data for a silicone rubber fin is also included for comparison. Fin A contains the very fine screen and Fin B contains the porous polyethylene.

TABLE II.—PERMEABILITY AND THICKNESS RESULTS FOR MEMBRANE MODULES OF ULTRATHIN POLYMER MEMBRANES OF THIS INVENTION AND CONVENTIONAL MEMBRANES

| Conditions and results | Present-past Fin A | Fin B | Conventional silicone rubber fin |
|---|---|---|---|
| Air flow rate at 100 p.s.i.g., cc./sec. | 6.2 | 9.7 | 7.5 |
| Percent $O_2$ at 100 p.s.i.g | 31.7 | 31.3 | 32.5 |
| Air flow rate at 30 p.s.i.g., cc./sec. | 1.7 | 3.0 | 2.8 |
| Percent $O_2$ at 30 p.s.i.g | 29.1 | 28.9 | 28 |
| Membrane area, $ft.^2$ | .15₈ | .19₄ | 4.0 |
| Measured membrane thickness, mil | (¹) | (¹) | 1.8 |
| Average permeability, $10^{-5}$ cc./$cm.^2$-sec.-cm. Hg | 7.8 | 10.5 | .44 |
| Average calcd. thickness, microns (mil) | 1.3 (.05) | 1.0 (.04) | 70 (2.8) |

¹ Too thin to measure directly.

Membrane thicknesses are calculated with the assumption that the permeability coefficients for air through block copolymer and silicone rubber are 10 and 30 (in units of $10^{-9}$ cc.(RTP)-cm./$cm.^2$-sec.-cm. Hg), respectively. Thickness is calculated from:

Thickness = Permeability coefficient/permeability

It is evident from a comparison of the average permeability of the ultrathin copolymer membrane fins with the permeability of the silicone rubber fin indicates that barring flow complications, a factor of about twenty in size reduction can be achieved by replacing the silicone rubber membrane with the ultrathin membrane and an additional support.

It is shown to be well within the capability of the casting method to prepare pinhole-free membranes that are .01 mil thick and therefore to achieve even larger size reductions in all applications where the ultrathin membrane can be adequately supported.

It is to be understood that other changes may be made in the particular embodiments of the invention in light of the above teachings, but that these will be within the full scope of the invention as defined by the appended claims.

What is claimed is:

1. A process for producing ultrathin polymer membranes which comprises:
   (a) preparing a casting solution of a permeable, nonporous membrane-forming polymer and a volatile solvent;
   (b) floating a support liquid on the upper surface of said casting solution, said support liquid being a nonsolvent for the polymer, and less dense than, and substantially immiscible with, said casting solution;
   (c) continuously transferring a film of the casting solution to the upper surface of the support liquid by passing a moving surface through the casting solution thereby picking up a film of the casting solution on said moving surface, and passing said moving surface bearing said film upwardly through the body of the support liquid and depositing the film of casting solution on the upper surface of the support liquid;
   (d) removing at least enough of the solvent from said film by evaporation to produce an ultrathin polymer membrane on the surface of the support liquid; and
   (e) passing a flexible inert support material over the support liquid into contact with the ultrathin polymer membrane and picking up the ultrathin polymer membrane from the surface of the support liquid.

2. A process as defined in claim 1 wherein said moving surface is the surface of a rotating roller.

3. A process as defined in claim 1 wherein said polymer comprises repeating units selected from arylene ether, organo-siloxane, aromatic carbonate, alkyl acrylate or alkyl methacrylate units or mixtures of any of the foregoing and blends, grafts, blocks and interpolymers comprised of such units.

4. A process as defined in claim 3 wherein said polymer includes repeating units comprising 2,6-diphenyl-1,4-phenylene ether units and dimethylsiloxane units.

5. A process as defined in claim 3 wherein said polymer includes repeating units derived from methyl methacrylate.

6. A process as defined in claim 3 wherein said polymer includes repeating units comprising bisphenol-A carbonate units and dimethylsiloxane units.

7. A process as defined in claim 6 wherein said repeating units are in alternating blocks.

8. A process as defined in claim 3 wherein said polymer is a blend of repeating units comprising 2,6-dimethyl-1,4-phenylene ether and alternating blocks of repeating units comprising bisphenol-A carbonate units and dimethylsiloxane units.

9. A process as defined in claim 3 wherein said solvent is a water-immiscible normally liquid organic compound having from one to ten carbon atoms and selected from the group consisting of a hydrocarbon, a hydrogen-carbon compound also containing halogen, a hydrogen-carbon compound also containing nitrogen, a hydrogen-carbon compound also containing oxygen, a hydrogen-carbon compound also containing sulfur, a hydrogen-carbon compound also containing a mixture of atoms selected from the group consisting of halogen, nitrogen, oxygen and sulfur and a mixture of the foregoing compounds.

10. A process as defined in claim 9 wherein said solvent is methylene chloride.

11. A process as defined in claim 9 wherein said support liquid is water.

12. A process as defined in claim 1 wherein said polymer includes alternating blocks of repeating units comprising bisphenol-A carbonate units and dimethylsiloxane units; said solvent is methylene chloride; and said support liquid is water.

13. A process as defined in claim 9 wherein said polymer includes alternating blocks of repeating units comprising bisphenol-A carbonate units and dimethylsiloxane units; said solvent is methylene chloride; and said support liquid is water.

14. A process for producing ultrathin polymer membranes which comprises:
   (a) preparing a casting solution of a permeable, nonporous membrane-forming polymer comprising repeating units selected from the group consisting of arylene ether units, organosiloxane units, aromatic carbonate units, alkyl acrylate units, alkyl methacrylate units and mixtures of any of the foregoing units and a volatile solvent for said polymer;
   (b) floating a support liquid on the upper surface of said casting solution, said support liquid being a nonsolvent for the polymer, and less dense than, and substantially immiscible with, said casting solution;
   (c) continuously transferring a film of the casting solution to the upper surface of the support liquid by passing the moving surface of a rotating roller through the casting solution thereby picking up a film of the casting solution on said moving surface, passing said moving surface bearing said film upwardly through the body of the support liquid and depositing the film of casting solution on the upper surface of the support liquid;
   (d) removing at least enough of the solvent from said film by evaporation to produce an ultrathin polymer membrane on the surface of the support liquid; and
   (e) passing a flexible inert support material over the support liquid into contact with the ultrathin polymer membrane and picking up the ultrathin polymer membrane from the surface of the support liquid.

15. A process as defined in claim 14 wherein said polymer includes alternating blocks of repeating units comprising bisphenol-A carbonate units and dimethylsiloxane units; said solvent is methylene chloride; and said support liquid is water.

References Cited
UNITED STATES PATENTS

| | | | |
|---|---|---|---|
| 2,334,233 | 11/1943 | Wood | 264—349 X |
| 2,708,617 | 5/1955 | Magat et al. | 264—298 X |
| 2,631,334 | 3/1953 | Bailey | 264—298 |
| 3,445,321 | 5/1969 | Groves | 264—298 X |
| 3,256,675 | 6/1966 | Robb | 55—16 |
| 3,653,180 | 4/1972 | Juliano et al. | 55—158 X |

OTHER REFERENCES

Kambour, R. P.: "Microdomains in Alternating Block Polymers of Dimethylsiloxane and Bisphenol-A Carbonate," Polymer Letters, vol. 7, pp. 573–577 (1969).

PHILIP E. ANDERSON, Primary Examiner

U.S. Cl. X.R.

55—158; 260—2.5 N, 2.5 S, 46.5 R, 824; 264—216, 298; 425—447